Figure 1:
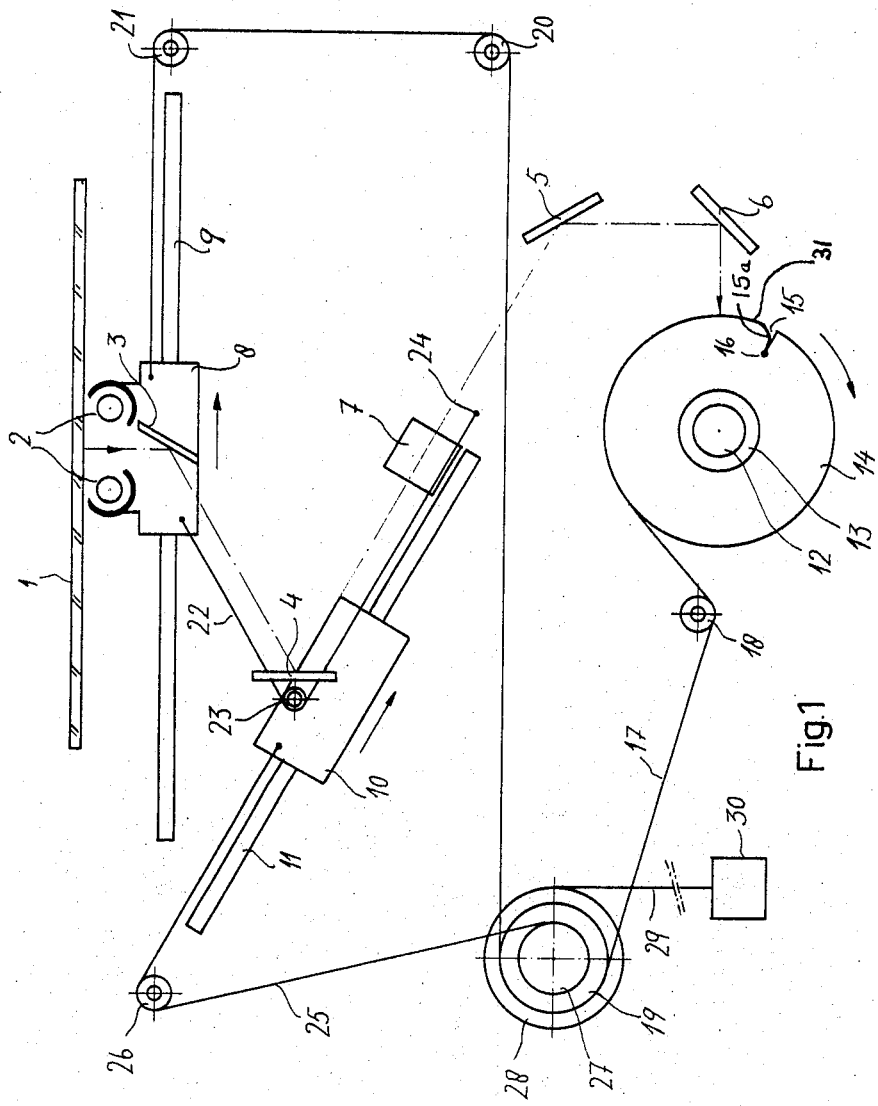

United States Patent [19]
Janssen et al.

[11] 3,815,991
[45] June 11, 1974

[54] DRIVE FOR RECIPROCABLE PARTS OF A PHOTOCOPYING OPTICAL SYSTEM

[75] Inventors: Willem P. H. A. Janssen, Blerick; Martin G. Paulissen, Horst, both of Netherlands

[73] Assignee: OCE-van der Grinten N.V., Venlo, Netherlands

[22] Filed: Dec. 15, 1972

[21] Appl. No.: 315,598

[30] Foreign Application Priority Data
Dec. 20, 1971 Netherlands............... 7117500

[52] U.S. Cl.................... 355/66, 355/8, 355/65
[51] Int. Cl. ............................. G03b 27/70
[58] Field of Search .............. 355/8, 64, 65, 66

[56] References Cited
UNITED STATES PATENTS
3,543,290 11/1970 Koizumi............................ 355/65
3,614,222 10/1971 Post ..................................... 355/8

Primary Examiner—John M. Horan
Attorney, Agent, or Firm—Albert C. Johnston

[57] ABSTRACT

In photocopying apparatus wherein originals are exposed stripwise by an optical system having reciprocable parts moved from rest position by a rope-like traction element, the time required for bringing these parts to the speed of the copying cylinder is limited by leading the traction element to a reel, by which it advanced for each exposure, over a roller spaced at a limited distance from the reel so that in an initial phase of rotation of the reel an angle between its periphery and the traction element is progressively diminished with corresponding gradual acceleration of said parts. The rate of acceleration and inertia effects at the outset of the reel movement can be further limited by fixing an end of the traction element in a recess having a side wall sloped smoothly inward from the periphery of the reel, so that the traction element will be engaged by that wall before being engaged and pulled upon said periphery.

6 Claims, 6 Drawing Figures

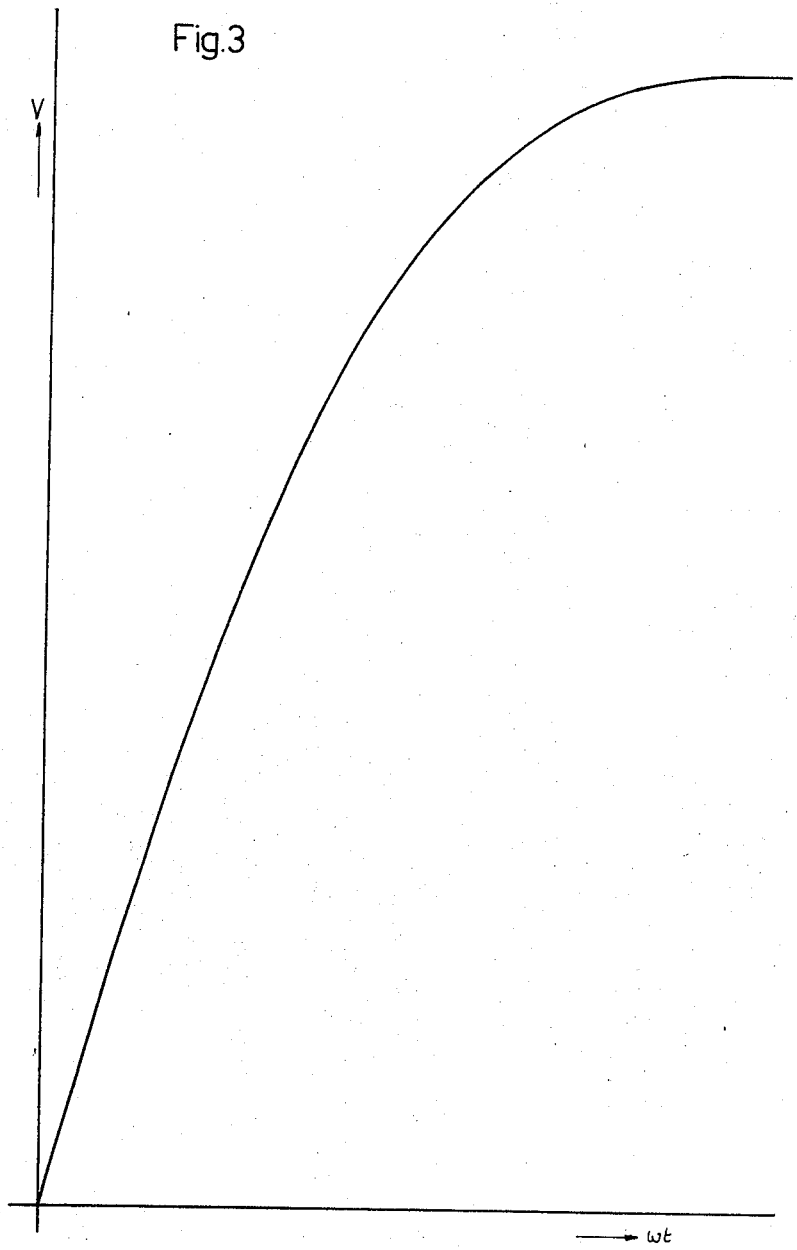

DRIVE FOR RECIPROCABLE PARTS OF A PHOTOCOPYING OPTICAL SYSTEM

This invention relates to an improved photocopying apparatus of a type making use of reciprocating elements as parts of an optical system for stripwise scanning the originals to be copied and projecting light from them to an image forming medium.

Apparatus of that type is known in which the optical system comprises parts which are driven from a stationary position by means of a flexible traction element connected at one end with those parts and connected at the other end to a reeling device such as a disc or drum having a substantially circular outer periphery. Upon rotation of the reeling device, as by coupling it to a drive element, the traction element is wound onto its periphery and the said parts are thus advanced through a fixed path or paths to effect stripwise exposure of an original with projection of light from it to the image forming medium.

In one known kind of such apparatus the reciprocable parts comprise small carriages or slides which are mounted for movement on rails or the like and carry lamps, mirrors and/or an objective by means of which, when the carriages are advanced, the image of a stationary original is projected stripwise to a moving light-sensitive medium which typically is the surface of a continuously rotated copying cylinder. In another known kind of such apparatus the lamps, mirrors and an objective are stationary and the original is laid on a carriage or slide and carried by it over an exposure slit so that light from the original will be projected stripwise to the moving light-sensitive medium.

The traction element in any case may consist of one or more ropes, cables, belts, chains, or similar elongate flexible pulling devices. The reeling device may be a freely rotatable disc or drum arranged to be coupled to the drive element by an electromagnetic or a mechanical clutch. The drive element may be a rotary shaft driven by an electric motor, e.g. the motor that drives the light-sensitive medium. The reel may also be driven by a lifted weight, a tension spring or other means.

In order to obtain sharp and uniformly exposed images it is essential that the light-sensitive medium and the movable parts of the optical system be moved uniformly and entirely synchronously during the exposure. This uniform motion, however, is not attained by the known apparatus immediately upon the coupling of the reeling device to the drive element; a considerable period occurs during which the movable parts of the optical system and the light-sensitive medium move non-uniformly and asynchronously. This initial non-uniform motion is a result of elastic deformations in the drive mechanism and fluctuations in speed which occur in the course of overcoming the mass inertia as the movable parts are brought into motion and accelerated. The period of its duration is lost from the useful working time of the photocopying apparatus.

The length of the period of non-uniform motion depends upon several factors, for instance, upon the speed of motion desired during the exposure and the mass of the parts to be driven. In low capacity apparatus (e.g. below 10 copies per minute) the period is usually rather short, because the operating speed is fairly low and the movable parts can be brought up to this speed relatively quickly. However, when similar apparatus is adapted for a considerably higher copying capacity (e.g. 40 copies/min.) by having the parts move at a high speed (e.g. approximately 30 m/min.), then the period necessary to reach the required uniformity and synchronization in the movements is objectionably long.

Many mechanisms are known by which an object may be gradually accelerated from zero speed up to a desired maximum or full speed. These known mechanisms, however, are not well suitable for the requirements of a photocopying apparatus.

The object of the present invention is to provide a remedy for the above problem, by which in a very simple manner the loss of useful working time required for bringing the reciprocable parts of such an apparatus up to the desired speed can be limited to a minimum.

It has been found that this object can be attained by providing for and utilizing in an apparatus of the known type hereinabove mentioned a path of movement of the traction element, as defined for example by a fixed guiding element located at a limited distance from the periphery of the reeling device and over which the traction element extends directly to its point of engagement with the reeling device, such that when the movable parts of the optical system are in their inactive, stationary position the traction element extends to the reeling device at an angle relative to the substantially circular periphery of said device, and such that the angle of the traction element relative thereto is progresively diminished during an initial period of the rotation of said device, until the traction element reaches a position tangential to said periphery.

Thus, upon activation of the reeling device to move said parts away from the stationary position for stripwise exposure of an original, the speed of the traction element increases smoothly from zero to the constant full value, even when that element and the movable parts connected to it must be brought to the full speed of the copying cylinder or other image forming medium within a fraction of a second. The speed of the traction element then progresses from zero up to the full value approximately according to a sinesoidal curve. In practice the required constant full speed can easily be reached, e.g. within one-tenth of a second, in a copier of medium size having a relatively high working speed, by directing the traction element from a fixed guiding roller to a reeling disc along a short path having, for example, a length of about 8 cm. as measured to the nearest part of the periphery of the disc.

If it is desired that the sinesoidal curve of acceleration be flatter at the outset of movement of the traction element, so as to obtain an even lower influence of the mass inertia while still rapidly reaching the full working speed, this can be achieved according to the invention by providing in a portion of the periphery of the reeling disc a recess having a bounding surface sloped smoothly from the substantially circular outer periphery of the disc and fixing an end of the traction element in this recess so that upon the initiation of rotation of the disc relative to the guiding roller the traction device abuts progressively against the sloped bounding surface of the recess before engaging the circular outer periphery of the disc. Preferably, the guiding roller is so disposed relative to the disc that the traction element is brought into engagement with that outer periphery before it reaches its position tangential to the disc.

An effective progressive angular displacement of the traction element relative to the disc can be obtained at the outset of rotation of the latter by locating the guiding means, such as a fixed guiding roller, at a distance from the disc which is smaller than two times the diameter of the disc yet is larger than one-twentieth of that diameter. Preferably, the distance is less than that diameter but greater than one-tenth of it.

The disc or other reeling device preferably is fitted for free rotation on a shaft by which the copying cylinder is rotated, and arranged to be coupled to this shaft by a clutch whenever desired.

The invention will now be further described with reference to an illustrative embodiment thereof which is shown schematically in the accompanying drawings wherein:

FIG. 1 is a schematic side view of a photocopying apparatus having reciprocable parts driven by pulling means according to the invention;

FIGS. 2a, 2b, 2c and 2d schematically represent four successive positions of the reeling disc and traction element; and FIG. 3 schematically represents a typical acceleration curve of the traction element and connected parts of the optical system.

Referring first to FIG. 1, it shows at 1 the glass plate of a photocopying apparatus, on which each original to be copied is placed. Lamps 2, mirrors 3, 4, 5 and 6 and objective 7 are provided for projecting image forming light from the original stripwise to a copying cylinder (not shown) on shaft 12, which cylinder is driven continuously and may be, for example, of the type described in a copending U.S. Pat. application, Ser. No. 222,916, filed Feb. 2, 1972.

The mirrors 5 and 6 and the objective 7 are rigidly installed. The lamps 2 and mirror 3 are mounted on a small carriage 8 which can be moved through a straight horizontal path over rails 9, and mirror 4 is mounted on a small carriage 10 which can be moved through a straight sloped path over rails 11.

A rope reeling disc, or pulley, 14 is mounted for free rotation on the shaft 12 of the copying cylinder and may be coupled to this shaft by a clutch 13 which preferably is an electromagnetic clutch. When clutch 13 is energized, disc 14 rotates with the copying cylinder. When clutch 13 is not energized, disc 14 is stationary or can rotate in opposite direction.

The periphery of the disc 14 is substantially circular but a portion of it is formed with an inwardly directed recess 15 in which at 16 one end of a rope 17 is fixed. The rope 17 extends from the disc 14 by passing successively over roller 18, pulley 19, and rollers 20 and 21 to carriage 8. Carriage 8 also has one end of a rope 22 connected to it, this rope extending from carriage 8 over a roller 23 fixed to carriage 10 and thence to an anchor point 24 where the other end of rope 22 is secured to the frame of the apparatus. Further, a rope 25 is attached at one end thereof to carriage 10 and extends over a roller 26 to a disc 27 to which its other end is secured. Finally, a drum 28 connected to disc 27 and pulley 19 has secured to its periphery a rope 29 which hangs from the drum and supports a weight 30 on its free end.

Accordingly, the reciprocable parts of the optical system of the copying apparatus, including carriages 8 and 10 and the lamps and mirrors mounted on them, are connected together so that they will be advanced together through a fixed path of each such part, so as to effect a stripwise exposure of an original placed on glass plate 1, by a pulling movement of the rope 17 which is attached at one end thereof to disc 14 and at the other end to carriage 8. When clutch 13 is energized and disc 14 is thus actuated to wind a length of rope 17 onto its periphery, the carriages with the lamps and mirrors thereon are moved along glass plate 1 by the pulling action of the abovementioned ropes. When the clutch 13 is de-energized and disc 14 thus is freed for rotation about shaft 12, the force exerted by weight 30 on drum 28, and through it on pulley 19 and rope 17 and on disc 27 and rope 25, returns the carriages to their initial, rest positions.

Figure 2A:
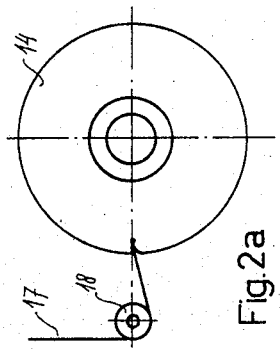
Figure 2B:
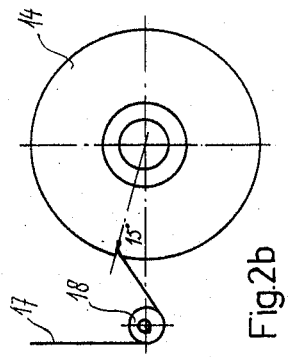
Figure 2C:
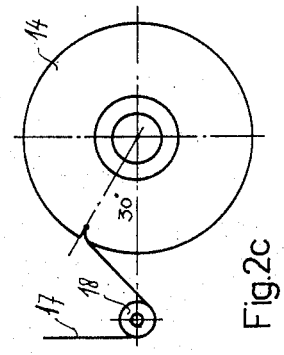
Figure 2D:
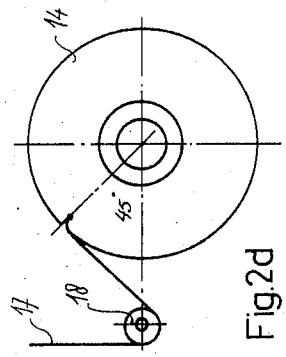

The diagrams of FIGS. 2a, 2b, 2c and 2d illustrate the angular dispositions of rope 17 relative to the periphery of reeling disc 14, and relative to roller 18, at several successive instants of an initial phase of rotation of disc 14. When the parts are in their normal rest position, rope 17 extends directly from roller 18 into the recess 15 of disc 14, at a large angle to the periphery of this disc, as indicated in FIG. 2a. The recess 15 has a bounding side wall 15a which is sloped smoothly inwardly from the circular periphery of the disc, as seen in FIG. 1. During a first increment of the initial disc rotation, the rope 17 is gradually engaged by this inwardly sloped recess wall, as indicated in FIG. 2b, with relatively little linear displacement of the rope by a given angular displacement of the disc. Then, the rope is engaged by a part of the circular periphery of the disc, as indicated in FIG. 2c, with its linear displacement increasing relative to an increment of angular displacement but still lower than the corresponding peripheral speed of the disc. Finally as concerns the initial phase of movement, the rope reaches a position of tangency to the periphery of the disc, as indicated in FIG. 2d, at which point its linear speed becomes identical to the peripheral speed of the disc.

Thus, the angle the rope relative to the disc progressively diminishes as the disc is rotated through an initial phase, e.g. of approximately 45°, until the rope is brought to a position of tangency to the disc. It is evident that the length of rope wound onto the disc by a given increment of angular displacement of disc 14 varies during the initial phase of the disc rotation and that, as a result, there is a regulated progressive increase of the speed of rope 17 and the parts coupled to it, relative to the peripheral speed of the disc, until the position of tangency is reached.

FIG. 3 schematically represents a typical speed curve thus obtained. As this graph indicates, the movable parts of the optical system are brought gradually and smoothly to the full speed of the copying cylinder. The time and the angular displacement of disc 14 are set out horizontally on FIG. 3, the speed of the traction element 17 vertically.

When the carriages are returned to their initial position by weight 30 after the advance movement, or "operating stroke," employed for an exposure, the shape of disc 14 and the distance between disc 14 and roller 18 have an effect similar to that provided in the initial phase of the advance movement, in that they then cause a gradual decrease of the speed of the reciprocable parts connected with the traction element 17.

If at the outset of movement it is satisfactory to have a slightly higher acceleration than that provided by the recess 15, such as may be the case in view of elasticities inherent in the system or when the clutch gradually brings the disc to its full speed, the recess 15 may be omitted and the rope 17 may be attached to the periphery of the disc 14, as at the point indicated by line 31. The outset of the speed curve then is slightly steeper than in FIG. 3, but only if the disc 14 immediately has the constant full speed.

What is claimed is:

1. In photocopying apparatus including an image forming medium, an optical system having parts movable through a fixed path away from and then back to a stationary position, for stripwise exposure of an original during each advance movement with projection of light from the original to said medium, and means for pulling said parts through said path, said pulling means including a reel having a substantially circular outer periphery an elongate flexible traction element connected at one of its ends to said reel and at the other end to said parts, a rotary drive element, and means for coupling said reel to said drive element to rotate the reel and wind the traction element thereon, the improvement which comprises means engaging a portion of said traction element at a limited distance away from said reel and guiding the traction element to said reel at an angle relative to said periphery which has its greatest value when said parts are in said stationary position and is progressively diminished during an initial period of the rotation of said reel.

2. Apparatus according to claim 1, said reel having a recess in a portion of said periphery, said one end of said traction element being secured in said recess, and said recess having a bounding surface sloped smoothly inward from the substantially circular outer periphery of said reel so that upon the initiation of rotation of said reel said traction element abuts progressively against said inwardly sloped surface before engaging said periphery.

3. Apparatus according to claim 2, said guiding means being so disposed relative to said reel that said traction element is brought into engagement with said periphery before reaching a position tangential thereto.

4. Apparatus according to claim 1, said distance being smaller than the diameter of said periphery and amounting to about 8 cm.

5. Apparatus according to claim 1, said guiding means being a roller to and upon which said traction element extends directly from said reel, said roller being fixed at a location such that the distance between its surface and said periphery of the reel is smaller than the diameter of said periphery but larger than one-tenth of said diameter.

6. In photocopying apparatus including an image forming medium, an optical system having parts movable through a fixed path away from and then back to a stationary position, for stripwise exposure of an original during each advance movement with projection of light from the original to said medium, and means for pulling said parts through said path, said pulling means including a reel having a substantially circular outer periphery, an elongate flexible traction element connected at one of its ends to said reel and at the other end to said parts, a rotary drive element, and means for coupling said reel to said drive element to rotate the reel and wind the traction element thereon, the improvement which comprises a roller to and upon which said traction element extends directly from said reel and which guides the traction element to said reel at an angle relative to said periphery which has its greatest value when said parts are in said stationary position and is progressively diminished during an initial period of the rotation of said reel, said roller being fixed at a location such that the distance between its surface and said periphery is smaller than the diameter of said periphery but larger than one-tenth of said diameter, said reel having a recess in a portion of said periphery, said one end of said traction element being secured in said recess, and said recess having a bounding surface sloped smoothly inwardly from the substantially circular outer periphery of said reel so that upon the initiation of rotation of said reel said traction element abuts progressively against said inwardly sloped surface before engaging said periphery.

* * * * *